United States Patent
Cai et al.

(10) Patent No.: US 10,334,416 B2
(45) Date of Patent: Jun. 25, 2019

(54) CONTROL OF GROUP TRIGGERS FOR MTC SERVICES

(71) Applicant: Alcatel-Lucent USA Inc., Murray Hill, NJ (US)

(72) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 796 days.

(21) Appl. No.: 13/838,169

(22) Filed: Mar. 15, 2013

(65) Prior Publication Data

US 2014/0274186 A1    Sep. 18, 2014

(51) Int. Cl.
*H04W 4/70*    (2018.01)
*H04W 4/12*    (2009.01)

(52) U.S. Cl.
CPC .............. *H04W 4/70* (2018.02); *H04W 4/12* (2013.01)

(58) Field of Classification Search
CPC .......... H04W 4/005; H04W 4/70; H04W 4/12
See application file for complete search history.

(56) References Cited

U.S. PATENT DOCUMENTS

| 8,885,568 | B2* | 11/2014 | Qu ..................... | H04M 15/765 370/328 |
| 9,319,867 | B2* | 4/2016 | Rivas Molina ..... | H04L 12/1407 |
| 9,654,900 | B2* | 5/2017 | Seed ..................... | H04W 4/005 |
| 2011/0270973 | A1* | 11/2011 | Liao ..................... | H04L 41/0681 709/224 |
| 2012/0275348 | A1* | 11/2012 | Zhou ..................... | H04L 12/14 370/259 |
| 2013/0182644 | A1* | 7/2013 | Kim ..................... | H04W 76/025 370/328 |
| 2014/0038549 | A1* | 2/2014 | Lehane ................ | H04W 24/02 455/406 |

OTHER PUBLICATIONS

3rd Generation Partnership Project; Architecture enhancements for non-3GPP accesses, 3GPP TS 23.402 V12.0.0 (Mar. 2013).
3rd Generation Partnership Project; Architecture enhancements to facilitate communications with packet data networks and applications, 3GPP TS 23.682 V11.3.0 (Dec. 2012).
3rd Generation Partnership Project; General Packet Radio Service (GPRS) enhancements for Evolved Universal Terrestrial Radio Access Network (E-UTRAN) access, 3GPP TS 23.401 V12.0.0 (Mar. 2013).
3rd Generation Partnership Project; Policy and Charging Control (PCC); 3GPP TS 29.212 V12.0.0 (Mar. 2013).

(Continued)

*Primary Examiner* — Asghar H Bilgrami
(74) *Attorney, Agent, or Firm* — Duft & Bornsen, PC

(57) ABSTRACT

Systems and methods for controlling group triggers for Machine-Type Communications (MTC) services. In one embodiment, a Services Capability Server (SCS) of a network receives a request indicating a group trigger from an MTC server to activate an MTC feature in a group of MTC devices. In response to the group trigger request, the SCS queries a Policy and Charging Rules Function (PCRF) for network policies defined for group triggers, and controls delivery of the group trigger to the group of MTC devices based on the network policies provided by the PCRF.

20 Claims, 7 Drawing Sheets

(56) References Cited

OTHER PUBLICATIONS

3rd Generation Partnership Project; Policy and charging control architecture, 3GPP TS 23.203 V12.0.0 (Mar. 2013).
3rd Generation Partnership Project; Service requirements for Machine-Type Communications, 3GPP TS 22.368 V12.2.0 (Mar. 2013).
3rd Generation Partnership Project; System improvements for Machine-Type Communications, 3GPP TR 23.888 V11.0.0 (Sep. 2012).
3rd Generation Partnership Project; Tsp interface protocol between the MTC Interworking Function (MTC-IWF) and Service Capability Server (SCS), 3GPP TS 29.368 V11.1.0 (Dec. 2012).

* cited by examiner

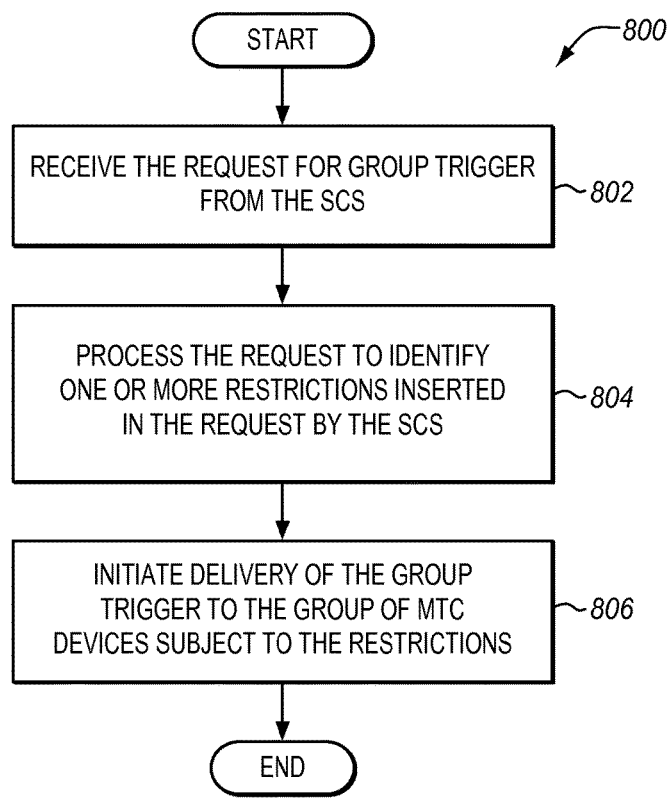

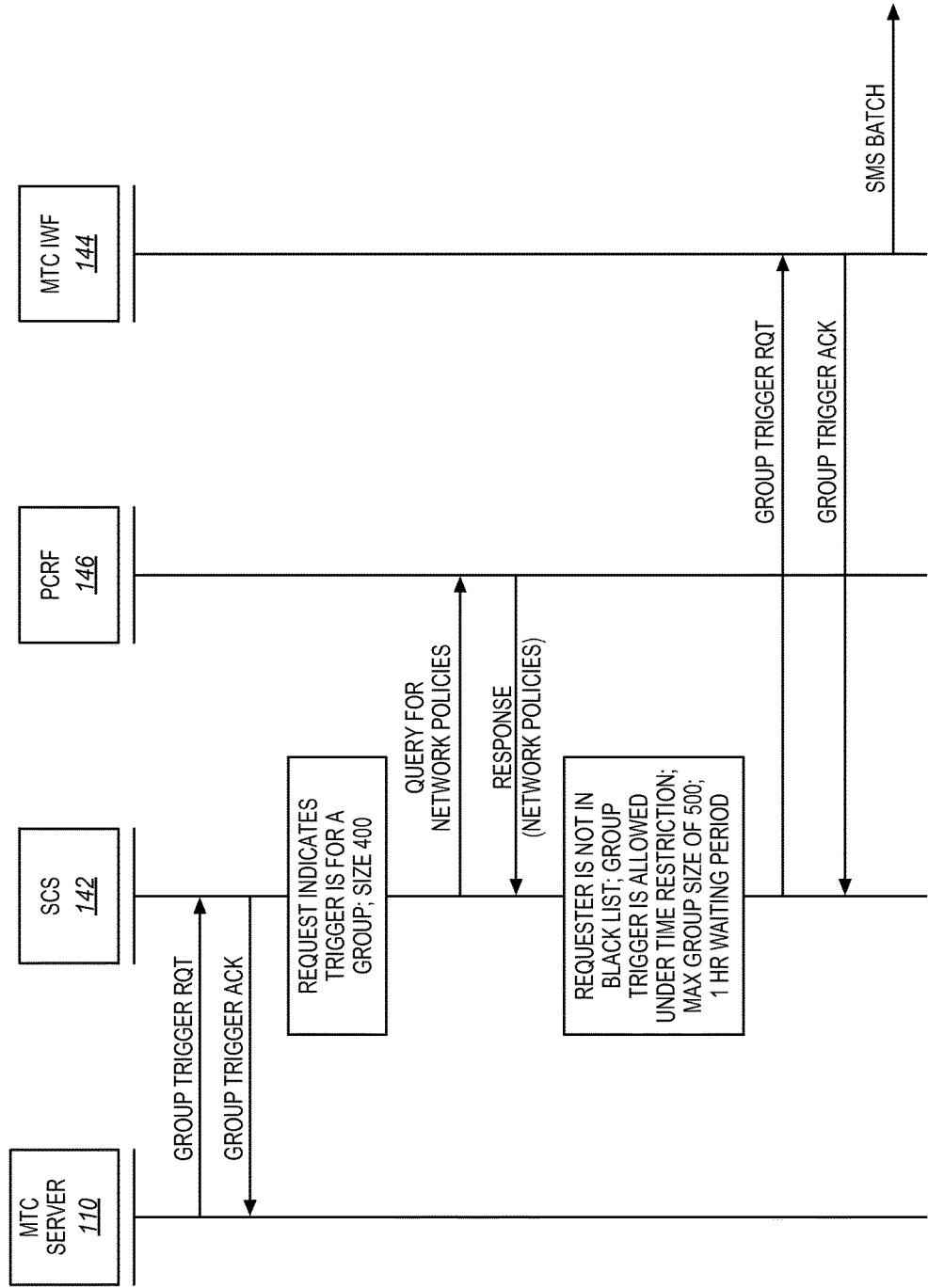

CONTROL OF GROUP TRIGGERS FOR MTC SERVICES

FIELD OF THE INVENTION

The invention is related to the field of communications and, in particular, to Machine Type Communications (MTC).

BACKGROUND

Machine Type Communications (MTC) (also referred to as Machine-to-Machine (M2M) communications) refer to technologies that allow devices to communicate directly with one another to provide a service, without human intervention. In its basic form, an MTC service includes an MTC server that is able to communicate with one or more MTC devices over a network. The MTC devices typically collect some sort of data, and report the data to the MTC server over the network. For example, an MTC device may be attached to a gas or electric meter, and the MTC device may periodically (e.g., daily, weekly, monthly, etc.) transmit a meter reading to an MTC server operated by the utility company. The amount of data exchanged between MTC devices and MTC servers is typically very small, such as less than a few bytes. Thus, the MTC devices are able to report the data to the MTC server in "small data transmissions", such as SMS messages.

To control an MTC device, the MTC server sends a trigger to the MTC device, which is typically referred to as a "device trigger". A device trigger is used to activate a feature in an MTC device. For example, an MTC device may not be allowed to send data over a network at will. Therefore, the MTC server may use a device trigger to periodically pull data from the MTC device. In another example, an MTC device may not be continually attached to the network. Therefore, the MTC server may use a device trigger to instruct the MTC device to attach to the network for communications.

Many network operators allow for group MTC services. In group MTC services, an MTC server sends a trigger to a group of MTC devices as opposed to a single MTC device. For example, MTC devices in the same area may be grouped together, MTC devices providing similar features may be grouped together, MTC devices belonging to the same MTC user may be grouped together, etc. A group of MTC devices is typically identified by group ID, and the MTC server is able to send a trigger to the group ID instead of an ID for an individual MTC device. A device trigger that is used for a group of MTC devices is referred to herein as a "group trigger". By handling MTC devices as a group, the amount of signalling exchanged between the MTC server and the group of MTC devices can be reduced as compared to a scenario where the MTC server communicates with MTC devices individually.

The use of MTC over networks is expanding and generating high revenues for network operators. As an illustration, a utility company may have thousands of subscriptions for MTC devices. Because of the popularity MTC, a typical network operator may have many more MTC subscriptions than regular user subscriptions. Thus, network operators strive to handle MTC in an efficient manner so that their networks do not become overloaded.

SUMMARY

Embodiments described herein control delivery of a group trigger to a group of MTC devices based on network policies. According to the following embodiments, a Service Capability Server (SCS) is implemented in a network between an MTC server and a group of MTC devices. When an MTC server initiates a group trigger for a group of MTC devices, the SCS receives a request for the group trigger from the MTC server. Before forwarding the group trigger request through the network for processing, the SCS contacts a Policy and Charging Rules Function (PCRF) in the network to determine if network policies have been defined for group triggers. The SCS then controls processing of the group trigger in the network based on the network policies. For example, some MTC servers may not be authorized for group triggers based on the network policies, so the SCS may reject the group trigger request. The network policies may also indicate particular times (e.g., non-peak) when group triggers are allowed, maximum group sizes for group triggers, a waiting time between successive group triggers, etc. By obtaining the network policies from the PCRF, the SCS can avoid overloading the network with group MTC services.

One embodiment comprises an SCS of a network that is configured to receive a request indicating a group trigger from an MTC server to activate an MTC feature in a group of MTC devices. The SCS is further configured to query a PCRF for network policies defined for group triggers, and to control delivery of the group trigger to the group of MTC devices based on the network policies provided by the PCRF.

In another embodiment, the SCS is further configured to process an identifier for the MTC server to determine whether the MTC server is authorized for group triggers based on the network policies, and to reject the group trigger request if the MTC server is not authorized.

In another embodiment, the SCS is further configured to process the network policies to identify a time restriction for group triggers, to determine if the group trigger is allowed based on the time restriction, to forward the group trigger request to an MTC interworking function if the group trigger is allowed based on the time restriction, and to queue the group trigger request if the group trigger is not allowed based on the time restriction.

In another embodiment, if the group trigger request is queued, then the SCS is further configured to provide an indication to the MTC server when the group trigger request will be forwarded to the MTC interworking function.

In another embodiment, the SCS is further configured to process the network policies to identify a group size restriction for group triggers, and to insert an indication of the group size restriction in the group trigger request.

In another embodiment, the SCS is further configured to process the network policies to identify a waiting period restriction between group triggers, and to insert an indication of the waiting period restriction in the group trigger request.

In another embodiment, the SCS is further configured to transmit the group trigger request to an MTC interworking function over a Diameter Tsp interface.

In another embodiment, the protocol between the SCS and the PCRF comprises Diameter.

In another embodiment, the protocol between the SCS and the PCRF comprises Lightweight Directory Access Protocol (LDAP).

Another embodiment comprises a method of controlling delivery of group triggers. The method includes the step of receiving a request in an SCS indicating a group trigger from an MTC server to activate an MTC feature in a group of MTC devices. The method further includes querying a PCRF for network policies defined for group triggers, and controlling delivery of the group trigger to the group of MTC devices based on the network policies provided by the PCRF.

In another embodiment, the method further comprises processing an identifier for the MTC server to determine whether the MTC server is authorized for group triggers based on the network policies, and rejecting the group trigger request if the MTC server is not authorized.

In another embodiment, the method further comprises processing the network policies to identify a time restriction for group triggers, determining if the group trigger is allowed based on the time restriction, forwarding the group trigger request from the SCS to an MTC interworking function if the group trigger is allowed based on the time restriction, and queuing the group trigger request in the SCS if the group trigger is not allowed based on the time restriction.

In another embodiment, the method further comprises providing an indication from the SCS to the MTC server when the group trigger request will be forwarded to the MTC interworking function.

In another embodiment, the method further comprises processing the network policies to identify a group size restriction for group triggers, and inserting an indication of the group size restriction in the group trigger request.

In another embodiment, the method further comprises processing the network policies to identify a waiting period restriction between group triggers, and inserting an indication of the waiting period restriction in the group trigger request.

Another embodiment comprises an SCS configured to connect to a PCRF of a network, and configured to connect to an MTC Interworking Function (IWF) of the network. The PCRF is configured to store network policies defined for group triggers for MTC services. The SCS is further configured to receive a group trigger request from an MTC server, and to query the PCRF to identify the network policies defined for group triggers. The SCS is further configured to process the network policies from the PCRF to identify restrictions for the group trigger, and to transmit the group trigger request to the MTC IWF indicating at least one of the restrictions.

In another embodiment, the SCS is configured to connect to the MTC IWF over a Tsp interface, and the SCS is configured to insert an indication of the at least one restriction in a parameter of the Tsp interface.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 8 is a flow chart illustrating an operation of an MTC Interworking Function (IWF) when receiving a group trigger in an exemplary embodiment.

FIG. 9 is a message diagram illustrating a delivery of a group trigger for an MTC service in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
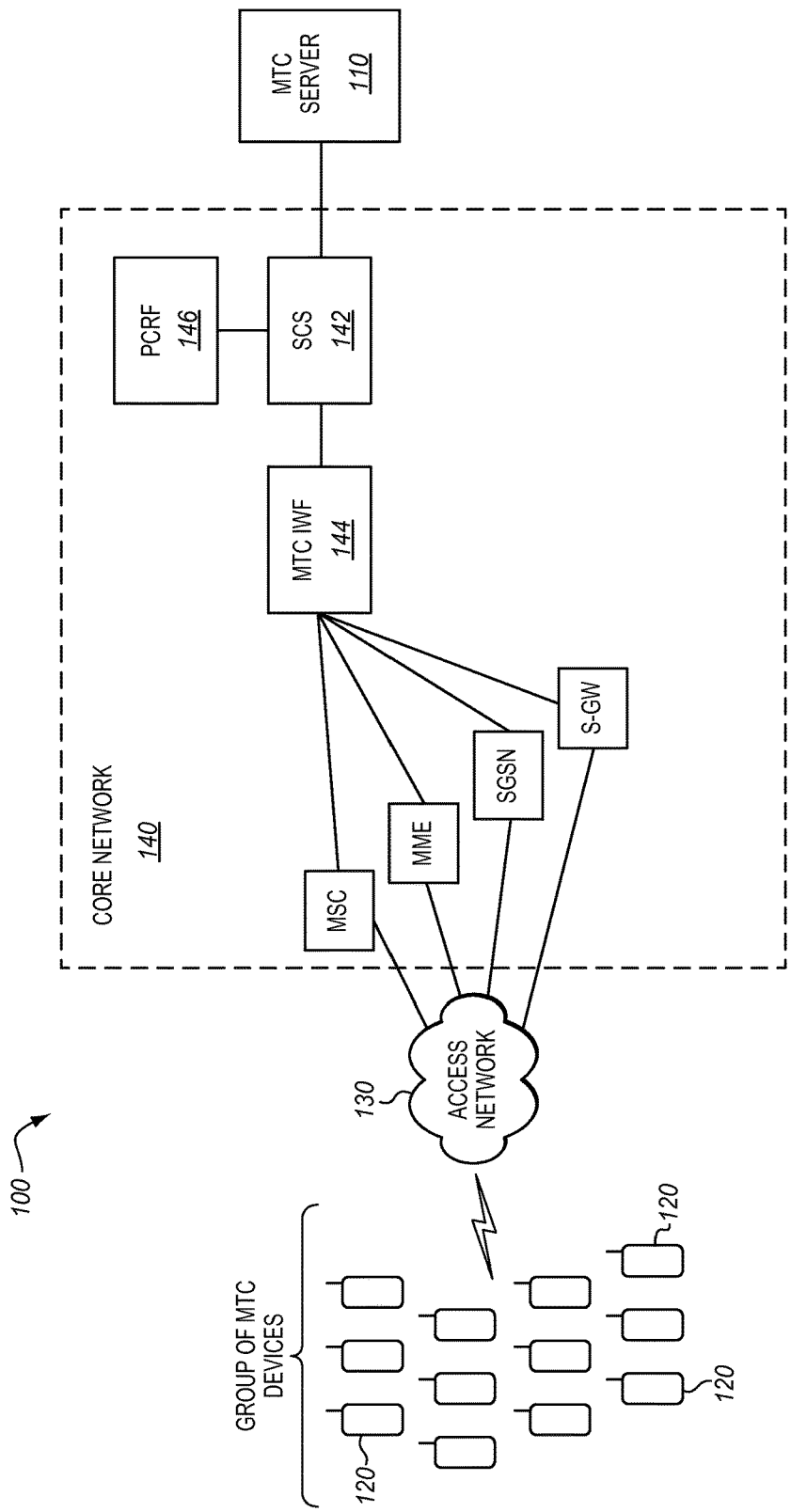
FIG. 1 illustrates a network for Machine Type Communications (MTC) services in an exemplary embodiment.

FIG. 1 illustrates a network 100 for MTC services in an exemplary embodiment. To provide MTC services, network 100 connects an MTC server 110 to a group of MTC devices 120. Each of MTC devices 120 is configured to perform a feature in response to a trigger from MTC server 110. For example, an MTC device 120 may collect data (e.g., collects temperature data, meter readings, etc) in response to a trigger, and relay the data over the network to MTC server 110. MTC server 110 executes one or more MTC applications to initiate the triggers to MTC devices 120, and to process data collected by MTC devices 120 in a desired manner. MTC server 110 may be referred to as an Application Server (AS) in some embodiments.

In FIG. 1, network 100 may comprise a Circuit-Switched (CS) network that is configured to provide traditional voice services, such as a GSM network, a CDMA2000 network, etc. Network 100 may also comprise a Packet-Switched (PS) data network that is configured to provide data services, such as a GPRS network, a UMTS network, an IMS network, an LTE network, etc. In this embodiment, network 100 includes an access network 130 and a core network 140. Access network 130 comprises any type of wireless network that interfaces a wireless device with core network 140. Some examples of access network 130 are a UTRAN, an E-UTRAN, a GERAN, an I-WLAN, etc. Core network 140 includes network elements that are configured to support MTC services. In this embodiment, core network 140 includes a Service Capability Server (SCS) 142 and an MTC Interworking Function (IWF) 144. SCS 142 is an entity that connects one or more MTC servers to network 100 to enable the MTC servers to communicate with MTC devices. MTC IWF 144 is an entity that relays or translates information (i.e., triggers) sent from SCS 142, and delivers the triggers to MTC devices. MTC IWF 144 may also be referred to as an MTC gateway. MTC IWF 144 may connect with SCS 142 over a Tsp interface, or another type of interface.

Network 100 includes multiple other elements that support MTC services. Some of these elements are illustrated in FIG. 1, such as a Mobile Switching Center (MSC), a Mobility Management Entity (MME), a Serving GPRS Support Node (SGSN) of a GPRS network, and a Serving Gateway (S-GW) of an LTE network. Network 100 may include many other elements that are not shown for the sake of brevity, such as a Home Subscriber Server (HSS), a Short Message Service Center (SMSC), etc.

Network 100 has been enhanced in the following embodiments to control usage of triggers for a group of MTC devices 120, which are referred to as group triggers. To do so, SCS 142 is configured to communicate with a Policy and Charging Rules Function (PCRF) 146 when receiving a group trigger from an MTC server. A PCRF is an entity in a network that determines policy rules for sessions over the network. In this embodiment, PCRF 146 stores network policies defined for group triggers. Network policies comprise rules that define how group triggers are handled in the network for MTC services. The network policies may include:

a time restriction (e.g., group triggers only allowed during certain time windows, such as non-peak times);

a group size restriction (e.g., maximum group size allowed);

a combination of time restriction and group size restriction;

a required waiting period between group triggers (e.g., 1 hour waiting period is required between two successive group triggers).

The network policies may include any other types of restrictions as desired by the network operator. PCRF 146 may store network policies that are global for any group trigger initiated by an MTC server. PCRF 146 may store also network policies that are specific to a particular MTC server or MTC user.

Figure 2:
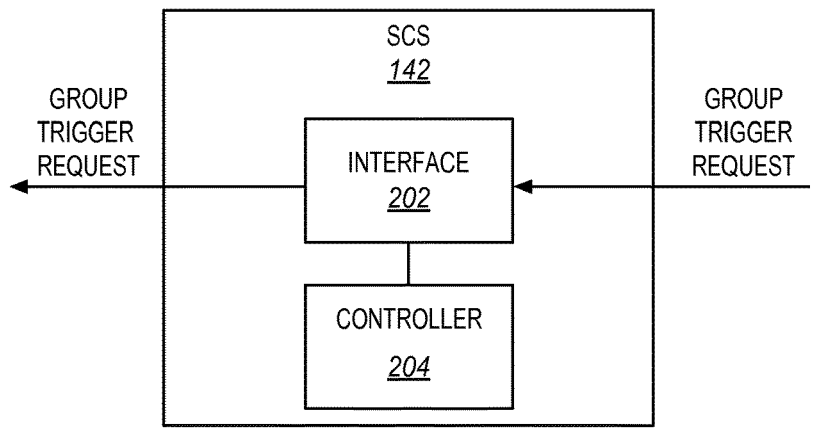
FIG. 2 is a block diagram of a Services Capacity Server (SCS) in an exemplary embodiment.

FIG. 2 is a block diagram of SCS 142 in an exemplary embodiment. In this embodiment, SCS 142 includes an interface 202 that is configured to communicate with one or more MTC servers, an MTC IWF, and a PCRF. For instance, interface 202 is able to receive group trigger requests from an MTC server, and forward the group trigger requests to an MTC IWF. SCS 142 also includes a controller 204 that is configured to process network policies defined for group triggers before forwarding the group triggers to other elements in network 100, such as MTC IWF 144. Thus, the processing or usage of group triggers is controlled by SCS 142 based on the network policies.

Assume for this embodiment that MTC server 110 (see FIG. 1) initiates a group trigger for a group of MTC devices 120. MTC server 110 inserts an indication of the group trigger in a request. For example, MTC server 110 may insert a group ID in the request that is defined for the group of MTC devices 120. MTC server 110 then sends the group trigger request to SCS 142 for delivery of the group trigger to each of the MTC devices 120 in the group. An exemplary operation of SCS 142 is described in FIG. 3 for handling the group trigger.

Figure 3:
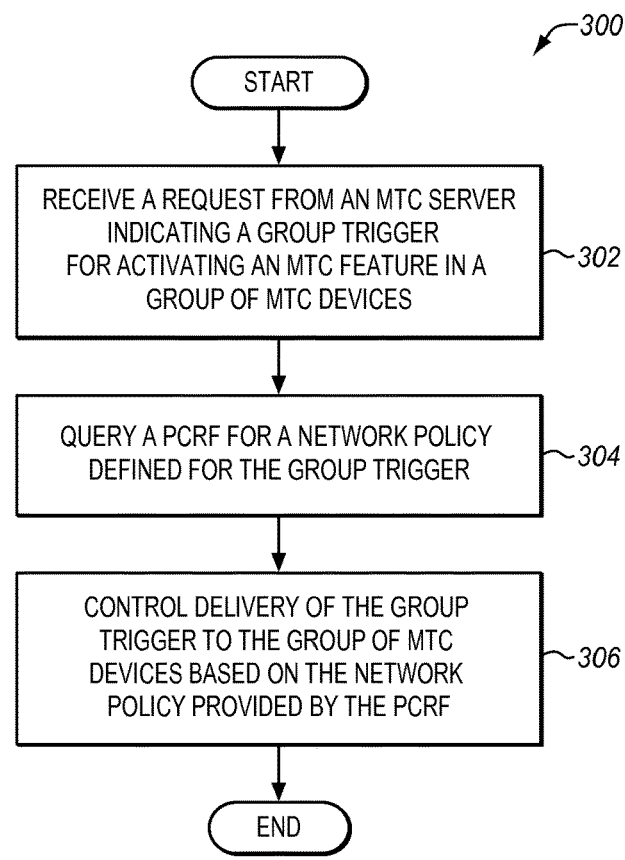
FIG. 3 is a flow chart illustrating a method of controlling delivery of a group trigger to a group of MTC devices in an exemplary embodiment.

FIG. 3 is a flow chart illustrating a method 300 of controlling delivery of a group trigger to a group of MTC devices in an exemplary embodiment. The steps of method 300 will be described with reference to SCS 142 in FIG. 1, but those skilled in the art will appreciate that method 300 may be performed in other nodes or devices. The steps of the flow charts described herein are not all inclusive and may include other steps not shown. The steps may also be performed in an alternative order.

In step 302, SCS 142 receives the group trigger request from MTC server 110 through interface 202 (see FIG. 2). Controller 204 in SCS 142 processes the request to identify that the trigger is for a group of MTC devices 120 (as opposed to a single MTC device). Before forwarding the group trigger request to MTC IWF 144 for processing, controller 204 transmits a query (through interface 202) to PCRF 146 for network policies defined for group triggers in step 304. SCS 142 may connect to PCRF 146 over a Diameter interface, a Lightweight Directory Access Protocol (LDAP) interface, or another type of interface. PCRF 146 identifies the network policies defined for group triggers, and provides the network policies to SCS 142 in a response to the query.

Controller 204 of SCS 142 then controls delivery of the group trigger to the group of MTC devices 120 based on the network policies provided by PCRF 126 in step 306. The network policies indicate rules defined by the network operator for handling group triggers in network 100. Thus, SCS 142 consults with the network policies before forwarding the group trigger request to MTC IWF 144. The network policies may indicate that the group trigger is not allowed, that the group trigger is not allowed at this time, that the group trigger is for too large of a group, etc. Therefore, SCS 142 may forward the group trigger request to MTC IWF 144 with restrictions, may forward the group trigger request to MTC IWF 144 at a later time, may not forward the group trigger request to MTC IWF 144 at all, etc., based on the network policies.

Figure 4:
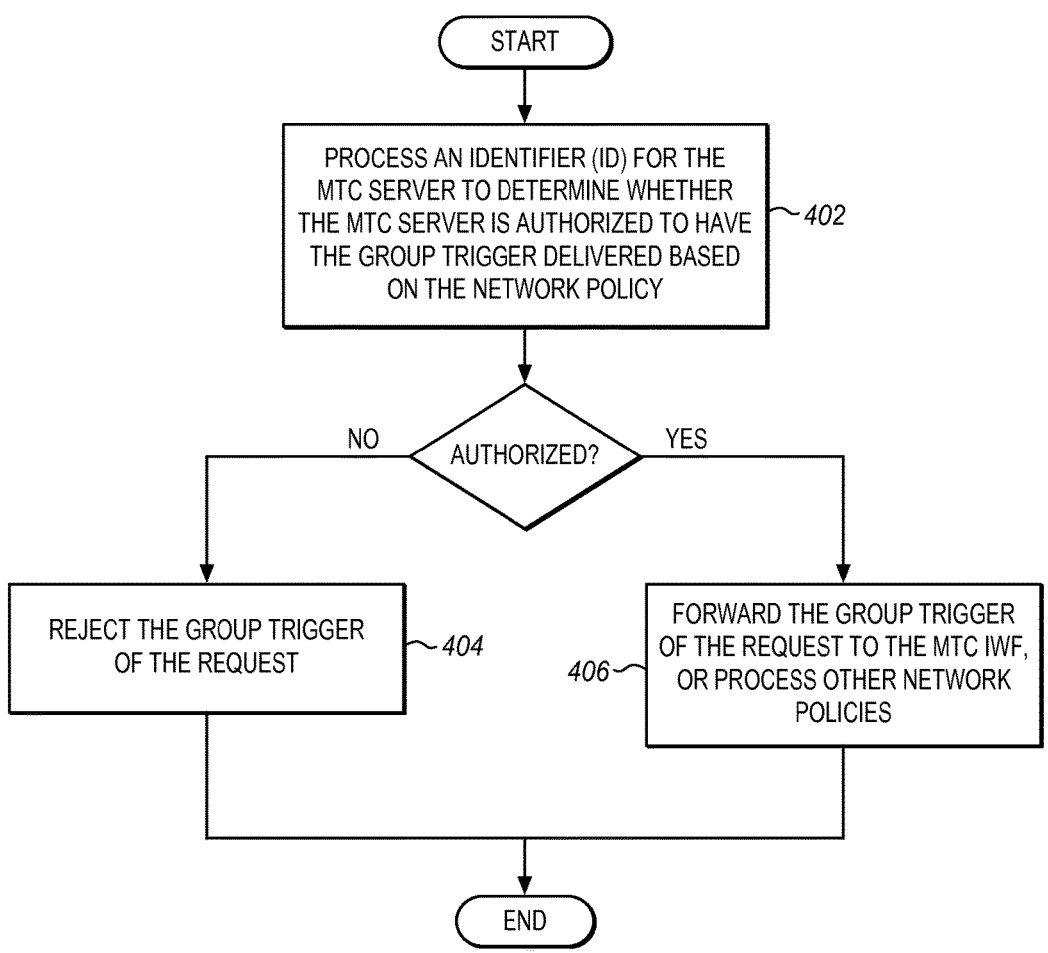
FIGS. 4-7 are flow charts illustrating the SCS processing network policies for group triggers in exemplary embodiments.

FIGS. 4-7 are flow charts illustrating SCS 142 processing network policies for group triggers in exemplary embodiments. In FIG. 4, the network policies indicate whether or not a particular MTC server is allowed to deliver a group trigger. In step 402, SCS 142 processes an identifier (ID) for MTC server 110 to determine whether MTC server 110 is authorized for group triggers based on the network policies. For example, the network policies may include a black list of MTC servers that cause recurring signalling congestion with group MTC services. These MTC servers on the black list are not allowed to send group triggers over network 100. If MTC server 110 is not authorized for group triggers, then SCS 142 rejects the group trigger request from MTC server 110 in step 404. Thus, SCS 142 is able to stop the group trigger request as soon as it is received in network 100 so that network resources are not wasted on a request that is not authorized. If MTC server 110 is authorized for group triggers, then SCS 142 may forward the group trigger request to MTC IWF 144, or may process other network policies (as described below) to further control delivery of the group trigger (step 406).

Figure 5:
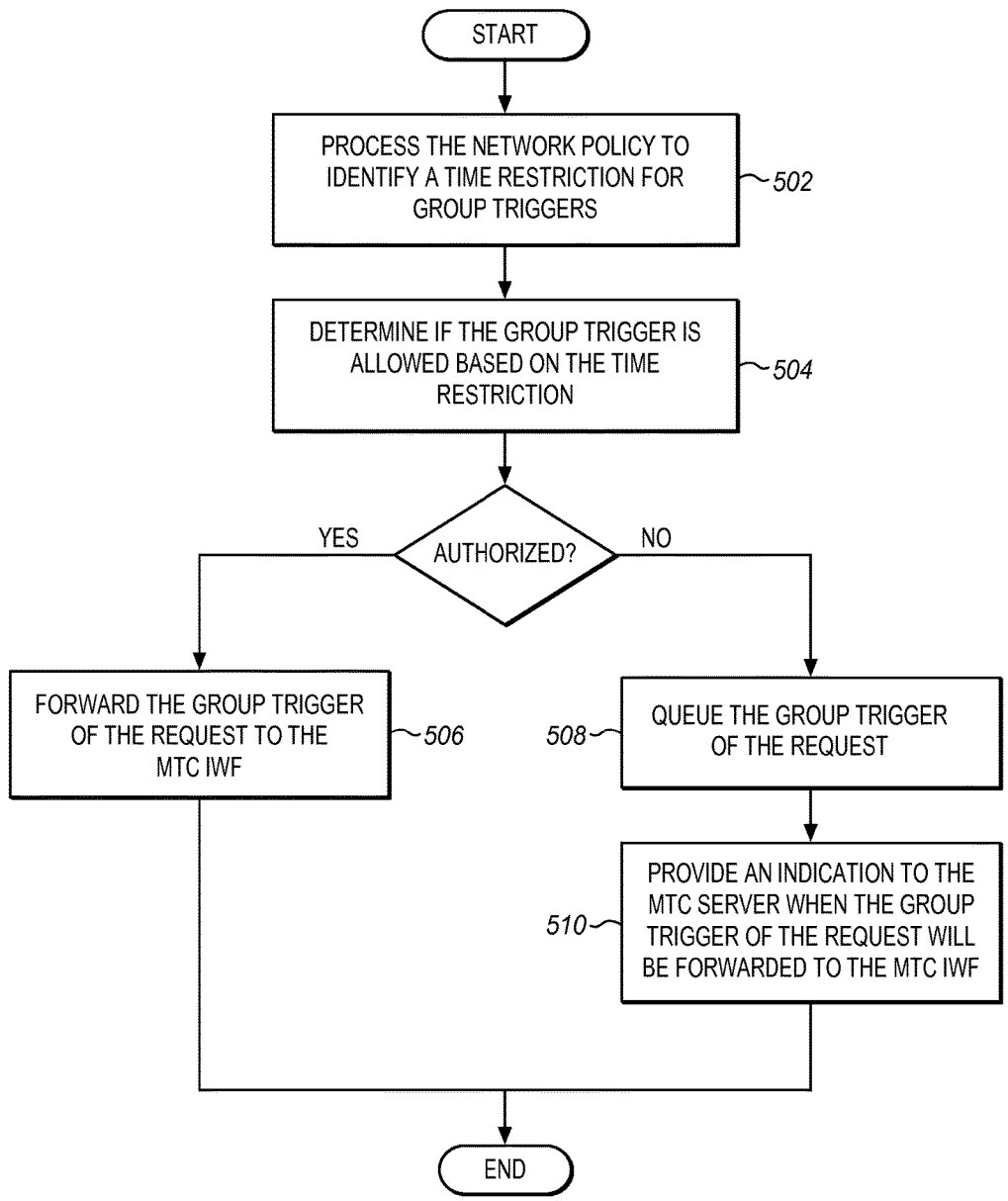

In addition to controlling whether or not the device trigger request is sent to MTC IWF 144, SCS 142 is able to restrict how and when the group trigger request is forwarded to MTC IWF 114 based on the network policies. In FIG. 5, SCS 142 processes the network policies to identify a time restriction for group triggers in step 502. The time restriction indicates time windows when group triggers are allowed or not allowed in network 100. For example, group triggers may not be allowed during peak hours, but may be allowed during non-peak hours (e.g., nights and weekends). SCS 142 then determines if the group trigger is allowed based on the time restriction in step 504. For example, SCS 142 determines whether the receipt time of the group trigger request is within an allowed time window or is outside an allowed time window. If the group trigger from MTC server 110 is allowed based on the time restriction, then SCS 142 forwards the group trigger request to MTC IWF 144 in step 506. If the group trigger is not allowed based on the time restriction, then SCS 142 queues the group trigger request for transmission to MTC IWF 144 at a later time in step 508. If the group trigger request is queued in step 508, then SCS 142 may also provide an indication to MTC server 110 when the group trigger request will be forwarded to MTC IWF 144 (step 510).

Figure 6:
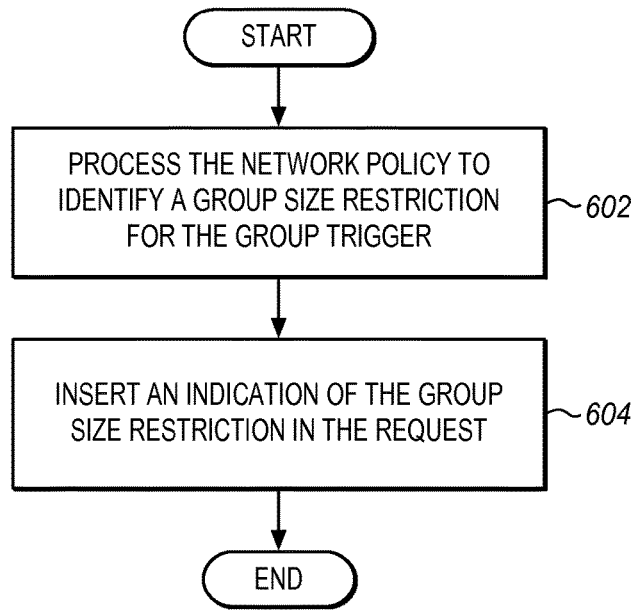

In FIG. 6, SCS 142 processes the network policies to identify a group size restriction for group triggers in step 602. The group size restriction indicates a maximum number of MTC devices allowed for a group trigger. SCS 142 then inserts an indication of the group size restriction in the group trigger request in step 604. The group trigger request may then be forwarded to MTC IWF 144 (subject to any other restrictions).

Figure 7:
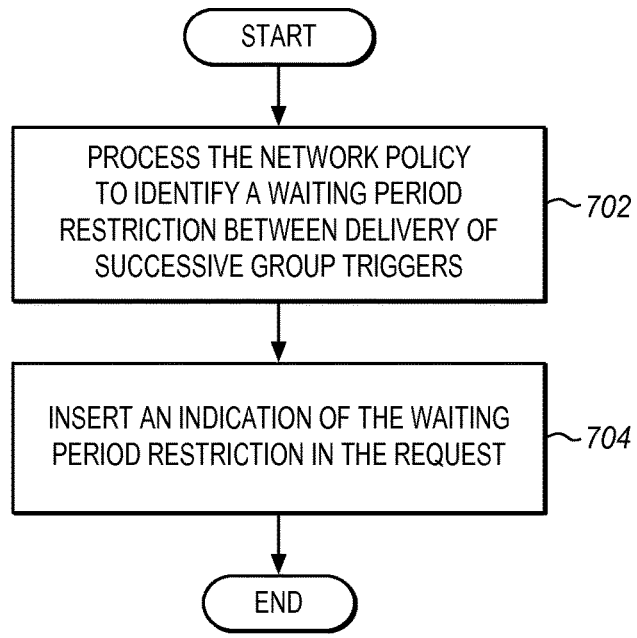

In FIG. 7, SCS 142 processes the network policies to identify a waiting period restriction for group triggers in step 702. The waiting period restriction indicates a minimum amount of time that is required between successive group triggers. For example, the minimum amount of time between two successive group triggers may be 1 hour, 2 hours, etc. SCS 142 then inserts an indication of the waiting period restriction in the group trigger request in step 704. The group trigger request may then be forwarded to MTC IWF 144 (subject to any other restrictions).

Any of the above network policies may be enforced by SCS 142 individually or collectively. Additionally, there may be multiple other examples of network policies that are defined for group triggers.

If the network policies allow the group trigger from MTC server 110 to be delivered to the group of MTC devices 120, then SCS 142 forwards the group trigger request to MTC IWF 144 for processing. MTC IWF 144 may then process the group trigger request to initiate delivery of the group trigger to the group of MTC devices 120. An exemplary operation of MTC IWF 144 is described in FIG. 8.

FIG. 8 is a flow chart illustrating an operation of MTC IWF 144 when receiving a group trigger in an exemplary embodiment. In step 802, MTC IWF 144 receives the group trigger request from SCS 142. In step 804, MTC IWF 144 processes the group trigger request to identify one or more restrictions inserted in the request by SCS 142. MTC IWF 144 then initiates delivery of the group trigger to the group of MTC devices 120 subject to the restrictions in step 806. For example, MTC IWF 144 may format an SMS message for each MTC device 120 in the group, and insert the group trigger in the SMS message. MTC IWF 144 may then forward the SMS messages to a message center so that the message center can deliver the SMS messages to the MTC devices 120.

If a group size restriction is indicated in the group trigger request, then MTC IWF 144 initiates delivery of the group trigger to the group of MTC devices 120 subject to the group trigger restriction. MTC IWF 144 identifies the size of the group of MTC devices 120, and compares the size of the group to the group size restriction. If the size of the group is less than the group size restriction, then MTC IWF 144 is able to initiate delivery of the group trigger to the group of MTC devices 120 in a normal fashion. If the size of the group is more than the group size restriction, then MTC IWF 144 segments the group of MTC devices 140 into subsets of MTC devices that each satisfies the maximum allowed group size for a group trigger. MTC IWF 144 then initiates delivery of the group trigger to each of the subsets. For example, MTC IWF 144 may format a first batch of SMS messages for a first subset of MTC devices, and forward the first batch of SMS messages to a message center. MTC IWF 144 may then format a second batch of SMS messages for a second subset of MTC devices, and forward the second batch SMS messages to a message center. MTC IWF 144 continues to send batches of SMS message to subsets of MTC devices until the group trigger is delivered to each of the MTC devices 120 in the original group.

In a similar manner, if a waiting period restriction is indicated in the group trigger request, then MTC IWF 144 initiates delivery of the group trigger to the group of MTC devices 120 subject to the waiting period restriction. MTC IWF 144 identifies the waiting period required for group triggers (e.g., 1 hour), and determines when the last group trigger was performed. If the waiting period for the last group trigger has expired, then MTC IWF 144 is able to initiate delivery of the group trigger to the group of MTC devices 120. If the waiting period for the last group trigger has not expired, then MTC IWF 144 delays delivery of the group trigger to the group of MTC devices 120 until the waiting period expires.

As is evident in the above embodiments, the use of group triggers in network 100 is controlled by policies stored in PCRF 146. In this new framework, PCRF 146 is queried before a group trigger can be delivered to a group of MTC devices 120. Thus, the policies implemented by a network operator will be enforced any time a group trigger is initiated, which helps ensure that Quality of Service (QoS) requirements are met for MTC services.

Example

FIG. 9 is a message diagram illustrating a delivery of a group trigger for an MTC service in an exemplary embodiment. In this example, MTC server 110 (see also FIG. 1) sends a group trigger request to SCS 142. The group trigger request from MTC server 110 indicates that the trigger is for a group of MTC devices 120, and that the size of the group is four-hundred (400) MTC devices. Because the request from MTC server 110 is for a group of MTC devices, SCS 142 transmits a query to PCRF 146 for network policies defined for group triggers. In response to the query, PCRF 146 transmits a response to SCS 142 indicating network policies defined for group triggers.

SCS 142 then processes the network policies before forwarding the group trigger request to MTC IWF 144. SCS 142 first determines whether MTC server 110 is authorized to initiate a group trigger. For example, the network policies may include a black list of MTC servers that cause recurring signalling congestion with group MTC services. If MTC server 110 is not on the black list, then SCS 142 processes other network policies for the group trigger. In this example, the network policies include a time restriction, a group size restriction of five-hundred (500) MTC devices in a group, and a waiting period restriction of 1 hour between successive group triggers.

If the receipt time of the group trigger request is within an allowed time window permitted by the time restriction (as is assumed in this example), then SCS 142 inserts an indication of the group size restriction (five-hundred (500) MTC devices) and an indication of the waiting period restriction (1 hour between group triggers) in the group trigger request, and forwards the group trigger request to MTC IWF 144.

MTC IWF 144 is the entity in network 100 that processes the group trigger, and initiates delivery of the trigger to the individual MTC devices in the group. MTC IWF 144 processes the group trigger request to identify any restrictions indicated in the request. In this example, a group size restriction and a waiting period restriction are included in the request. Because the number of MTC devices (four-hundred (400)) for this group trigger is less than the group size restriction (five-hundred (500)), MTC IWF 144 determines that the group size restriction is satisfied. If the waiting period restriction (1 hour between successive group trigger requests) is also satisfied, then MTC IWF 144 formats a batch of SMS messages (400) that include the trigger for the desired MTC service. MTC IWF 144 then sends the batch of SMS message to a message center (not shown) for delivery to the individual MTC devices of the group.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
   a Services Capability Server (SCS) implemented in a network between a Machine-Type Communications (MTC) server and a group of MTC devices;
   the SCS is configured to receive a group trigger request from the MTC server indicating a group trigger for activating an MTC feature in the group of MTC devices;
   before forwarding the group trigger to the group of MTC devices, the SCS is configured to query a Policy and Charging Rules Function (PCRF) for a network policy defined for the group trigger; and
   the SCS is configured to control delivery of the group trigger to the group of MTC devices based on the network policy provided by the PCRF.

2. The apparatus of claim 1 wherein:
   the SCS is further configured to process an identifier of the MTC server and the network policy to determine whether the MTC server is authorized to have the group trigger delivered to the group of MTC devices, to reject the group trigger if the MTC server is not authorized to have the group trigger delivered, and to forward the group trigger request to an MTC interworking function if the MTC server is authorized to have the group trigger delivered.

3. The apparatus of claim 1 wherein:
   the SCS is further configured to process the network policy to identify a time restriction for the group trigger, to determine if the group trigger is allowed based on the time restriction, to forward the group trigger request to an MTC interworking function if the group trigger is allowed based on the time restriction, and to queue the group trigger request if the group trigger is not allowed based on the time restriction.

4. The apparatus of claim 3 wherein:
   the SCS is further configured to provide an indication to the MTC server of when the group trigger request will be forwarded to the MTC interworking function in response the group trigger request being queued.

5. The apparatus of claim 1 wherein:
   the SCS is further configured to process the network policy to identify a group size restriction for the group trigger, to insert an indication of the group size restriction in the group trigger request, and to forward the group trigger request to an MTC interworking function.

6. The apparatus of claim 1 wherein:
   the SCS is further configured to process the network policy to identify a waiting period restriction between the delivery of successive group triggers, to insert an indication of the waiting period restriction in the group trigger request, and to forward the group trigger request to an MTC interworking function.

7. The apparatus of claim 1 wherein:
   the SCS is further configured to transmit the group trigger request to an MTC interworking function over a Diameter Tsp interface.

8. The apparatus of claim 1 wherein:
   the SCS is configured to communicate with the PCRF using Diameter protocol.

9. The apparatus of claim 1 wherein:
   the SCS is configured to communicate with the PCRF using Lightweight Directory Access Protocol (LDAP).

10. A method operable in a Services Capability Server (SCS) implemented in a network between a Machine-Type Communications (MTC) server and a group of MTC devices, the method comprising:
    receiving a group trigger request in the SCS from the MTC server indicating a group trigger for activating an MTC feature in the group of MTC devices;
    before forwarding the group trigger to the group of MTC devices, querying a Policy and Charging Rules Function (PCRF) with the SCS for a network policy defined for the group trigger; and
    controlling, in the SCS, delivery of the group trigger to the group of MTC devices based on the network policy provided by the PCRF.

11. The method of claim 10 wherein controlling delivery of the group trigger comprises:
    processing an identifier for the MTC server and the network policy to determine whether the MTC server is authorized to have the group trigger delivered to the group of MTC devices;
    rejecting the group trigger when the MTC server is not authorized; and
    forwarding the group trigger request from the SCS to an MTC interworking function if the MTC server is authorized to have the group trigger delivered.

12. The method of claim 10 wherein controlling delivery of the group trigger comprises:
    processing the network policy to identify a time restriction for the group trigger;
    determining if the group trigger is allowed based on the time restriction;
    forwarding the group trigger request from the SCS to an MTC interworking function if the group trigger is allowed based on the time restriction; and
    queuing the group trigger request in the SCS if the group trigger is not allowed based on the time restriction.

13. The method of claim 12 wherein when the group trigger request is queued, then the method further includes:
   providing an indication from the SCS to the MTC server of when the group trigger request will be forwarded to the MTC interworking function.

14. The method of claim 10 wherein controlling delivery of the group trigger comprises:
   processing the network policy to identify a group size restriction for the group trigger;
   inserting an indication of the group size restriction in the group trigger request; and
   forwarding the group trigger request from the SCS to an MTC interworking function.

15. The method of claim 10 wherein controlling delivery of the group trigger comprises:
   processing the network policy to identify a waiting period restriction between the delivery of successive group triggers;
   inserting an indication of the waiting period restriction in the group trigger request; and
   forwarding the group trigger request from the SCS to an MTC interworking function.

16. The method of claim 10 wherein:
   the SCS connects with an MTC interworking function over a Diameter Tsp interface.

17. The method of claim 10 wherein:
   the SCS and the PCRF communicate using Diameter protocol.

18. The method of claim 10 wherein:
   the SCS and the PCRF communicate using Lightweight Directory Access Protocol (LDAP).

19. An apparatus comprising:
   a Services Capability Server (SCS) configured to connect to a Policy and Charging Rules Function (PCRF) of a network, and configured to connect to a Machine-Type Communications (MTC) Interworking Function (IWF) of the network;
   wherein the PCRF is configured to store at least one network policy defined for a corresponding group trigger of a MTC service;
   wherein the SCS is further configured to receive a group trigger request from an MTC server;
   wherein before forwarding the group trigger to the group of MTC devices, the SCS is further configured to query the PCRF to identify the at least one network policy defined for the corresponding group trigger indicated by the group trigger request; and
   wherein the SCS is further configured to process the at least one network policy from the PCRF to identify one or more restrictions for the corresponding group trigger, and to transmit the group trigger request to the MTC IWF indicating at least one of the one or more restrictions.

20. The apparatus of claim 19 wherein:
   the SCS is configured to connect to the MTC IWF over a Tsp interface; and
   the SCS is configured to insert an indication of the at least one of the one or more restrictions in a parameter of the Tsp interface.

* * * * *